United States Patent [19]

Schlup et al.

[11] Patent Number: 5,468,509
[45] Date of Patent: Nov. 21, 1995

[54] PROCESS FOR PRODUCING WATER-CONTAINING MILK CHOCOLATE

[75] Inventors: Raphael Schlup, Bern, Switzerland; Theodore S. Lioutas, Sarasota, Fla.

[73] Assignee: Kraft Jacobs Suchard, Zurich, Switzerland

[21] Appl. No.: 219,589

[22] Filed: Mar. 29, 1994

[51] Int. Cl.$^6$ ........................................................ A23G 1/00
[52] U.S. Cl. .......................................... 426/548; 426/660
[58] Field of Search ...................................... 426/548, 660

[56] References Cited

U.S. PATENT DOCUMENTS

| | | | |
|---|---|---|---|
| 4,594,259 | 6/1986 | Baker et al. | 426/613 |
| 4,810,516 | 3/1989 | Kong-Chan | 426/548 |
| 4,980,181 | 12/1990 | Camp | 426/98 |
| 4,980,189 | 12/1990 | Keme | 426/660 |
| 5,017,400 | 5/1991 | Olinger | 426/660 |
| 5,066,510 | 11/1991 | Ehrman et al. | 426/607 |
| 5,120,566 | 6/1992 | Baba et al. | 426/631 |
| 5,244,690 | 9/1993 | Van der Schueren et al. | 426/660 |
| 5,266,348 | 11/1993 | Zumbe | 426/548 |
| 5,275,835 | 1/1994 | Masterson et al. | 426/607 |

*Primary Examiner*—Carolyn Paden
*Attorney, Agent, or Firm*—Joyce P. Hill; Thomas R. Savoie; Thomas A. Marcoux

[57] ABSTRACT

A product and process is provided to produce a one phase chocolate tablet containing from 1 to 16 percent water eliminating the normally required conching step.

9 Claims, No Drawings

PROCESS FOR PRODUCING WATER-CONTAINING MILK CHOCOLATE

BACKGROUND OF THE INVENTION

The present invention relates to an improved and unique process for producing a highly desirable water-containing chocolate composition. More specifically, the invention relates to a process for producing a milk chocolate composition containing up to 16 percent water capable of being molded into a one phase tablet. The chocolate composition of this invention can be produced without using a conching step to provide a sugar-water containing or sucrose-free water-containing milk chocolate composition.

Heretofore, conching of chocolate compositions was a required step to produce a finished chocolate product. Furthermore, the addition of water to chocolate composition generally created serious detrimental effects to the product and the product could not be handled or molded because of the exceptionally high viscosity caused by the presence of water. By the process of this invention, a highly desirable chocolate composition can be prepared containing up to 16 weight percent water and the preparation occurs without using a conching step.

SUMMARY OF THE INVENTION

In accordance with this invention, a process is provided for producing a milk chocolate composition containing from about 1 to about 16 weight percent water which comprises the following steps:

(1) Cocoa butter is mixed with cocoa in the presence of an edible emulsifier to coat or cover completely said cocoa;

(2) Water, a sweetener and milk solids are blended to form an aqueous product;

(3) The cocoa butter coated cocoa of step (1) is blended with a minimum of mixing with the aqueous milk product of step (2) in such a manner to form a uniform mixture without any separation of the ingredients avoiding shear rates which would expose the cocoa coated with cocoa butter to the water. When the water contacts the cocoa there is a significant viscosity increase of the chocolate composition and a possible separation of the ingredients in the composition;

(4) The resulting product of step (3) is tempered in the temperature range from about 27° C. to about 32° C., preferably for milk chocolate at 28° C.

The resulting chocolate composition can be molded and easily removed from the mold after cooling.

DETAILS OF THE INVENTION

The unusual chocolate compositions of this invention can include sugar-containing chocolate products or sucrose-free sugar alcohol-containing products. Both of these products can be made containing from about 1 to about 16 weight percent water and these products can be molded, if desired, in a one phase chocolate tablet. The texture and mouthfeel of these products are similar to conventional chocolate.

The chocolate compositions of this invention can be prepared by a specific technique. The initial step is to coat or cover the cocoa completely with the cocoa butter. The amount of cocoa butter used must be sufficient to coat completely the cocoa product and also present in amounts to supply a sufficient amount of fat in the total chocolate composition in the range from about 25 to about 40 weight percent, preferably about 27 to about 35 weight percent. The cocoa ingredients are obtained from cocoa liquor, cocoa powder, dutched cocoa powder or mixtures thereof. The cocoa component can be present in the chocolate composition in amounts from about 10 to about 30 weight percent, preferably about 15 to about 20 weight percent of the total chocolate composition. The "cocoa liquor" refers to the solid or semi-plastic food prepared by finely grinding cacao nibs. Cocoa liquor usually contains from about 50 to about 58% cocoa butter fat. "Cocoa powder" as used herein, refers to the residual material remaining after part of the cocoa butter fat has been removed from ground cacao nibs. Cocoa powder usually contains from about 10 to about 22% cocoa butter fat. The dutched cocoa powder is well known to be treated by alkalis such as carbonate, bicarbonate or hydroxide of potassium, sodium or ammonium, or any combination thereof. The alkali treatment can be used to change the color of the cocoa if a specific color is desired.

The cocoa used herein must be previously prepared to provide the desired texture of the chocolate composition. The size of the cocoa should range from about 10 or lower to about 60 microns, preferably about 20 to about 40 microns. The cocoa can be ground to the desired sizes before using or can be ground to the desired size in the presence of the cocoa butter.

An aqueous product containing a blend of water, a sweetener and milk solids is required to be prepared to be used in this process of this invention. The amount of water in the aqueous product is dependent of the amount of water desired in the total chocolate composition. The water in the total composition should not exceed about 16 weight percent. On this basis, the water in the aqueous product can range from about 2 to about 35 weight percent. The milk solids in the total chocolate composition can range from about 10 to about 20 weight percent preferably about 12 to about 18 weight percent. The sweetener which can be used in the aqueous product containing water, sweetener and milk products include regular sugar or other sugars selected from the group consisting of sucrose, fructose, glucose, maltose and mixtures thereof. Another type of sweetener which can be used is a sugar alcohol, which can include, among others, sorbitol, mannitol, isomalt, maltitol, xylitol, erythritol, glactitol and mixtures thereof. The amount of sugar which can be present can range from about 20 to about 50 weight percent, preferably about 20 to about 30 weight percent of the total chocolate composition. The amount of sugar alcohols can range from about 5 to about 55 weight percent, preferably about 10 to about 40 weight percent of the total chocolate composition. The water in the aqueous milk product can be obtained from other sources such as fruit juices, regular milk, buttermilk, cream and the like.

In the production of the sugar-containing conventional milk chocolate, sweetened condensed milk, and an evaporated milk product containing added sugar can be used. Known sweetened condensed milk products can include:

(1) Sweetened condensed skimmed milk having a minimum of 24 percent milk solids and not more than 1% fat;

(2) Sweetened condensed partially skimmed milk having a minimum of 24% to 28% milk solids and between 1 to 8 percent fat;

(3) Sweetened condensed milk having minimum milk solids of 28 to 31% and a minimum fat content of 8 to 9 percent.

Sweetened condensed milk is available as full cream with 8% butter fat or skimmed milk with nearly all the fat removed. These products can be standardized by the separation of the fat which is then remixed in controlled quantities before evaporation with sugar.

Typical analyses are:

|  | Full Cream | Skimmed |
| --- | --- | --- |
| Fat | 8.5% | 1.0% |
| Sugar | 42.0% | 46.0% |
| Lactose | 11.5% | 13.0% |
| Protein | 9.0% | 10.0% |
| Water | 27.0% | 28.0% |

For dietary reasons, the sugar can be completely or partially substituted with a sugar alcohol. For further calorie reduction, the sugar or sugar alcohol can be completely or partially substituted with a reduced calorie sweetener. These reduced calorie sweeteners can include, among others, aspartame, saccharin, alitame, cyclomates, acesulfame, acesulfame-K and the like. When these reduced calorie sweeteners are used, it can be desirable to include bulking agents or edible carbohydrates having relatively low metabolizable calorie content. These consist of easily metabolized sugars like glucose and fructose linked together to form polymers by bonds which cannot be split by enzymes in the human body. These carbohydrates are only partially metabolized and can therefore have calorie contents which are lower than that of sugar. Such carbohydrates can include polydextrose, oligofructose, inulin and the like. Polydextrose is a randomly bonded condensation polymer of D-glucose having an upper molecular weight limit typically exceeding 22,000 while oligofructose consists of a mixture of polymers of fructose with a much lower degree of polymerization, the majority being from two to five fructose units. Polydextrose is the preferred edible carbohydrate, however, its inclusion in conventional sugar-free milk chocolate compositions can degrade the texture and mouthfeel of the resultant chocolate and polydextrose must be used in such a manner to avoid detrimental effects. These carbohydrates can be present in amounts from about 10% to about 45%, preferably from about 10% to about 26% of the total composition.

In the mixture of the components of the chocolate composition of this invention, edible emulsifiers such as lecithin, polyglycerol polyricinoleate, ammonium phosphatide and the like can be used in amounts ranging from about 0.05 to about 1.5 weight percent, preferably about 0.1 to about 0.5 weight percent of the total chocolate composition. In addition, flavoring agents and any other ingredient conventionally used in milk chocolate compositions can be used. Furthermore, ingredients with low calorie count can be used in the milk chocolates of this invention including among others, cereal fibers, cocoa fibers, vegetable fibers, cellulose such as microcrystalline cellulose, pectins and edible gums.

The important feature of this invention is the mixing of the cocoa-butter-coated cocoa with the aqueous product of water, sweetener and milk solids. The mixing must be conducted in a method so that the mixing must be kept to a minimum speed to avoid the exposure of the cocoa in the cocoa butter coated cocoa to the water yet provide a uniform mixture of the mixing components, i.e., until all ingredients are enveloped/emulsified into the cocoa butter phase. If the cocoa in the cocoa butter is exposed to the water, undesirable high viscosities such as gum formation and lumps of the mixed products as well as separation of the mixed products will result. This must be avoided and if continual mixing is conducted as is used in conching and refining, undesirable and unusable product will result.

The tempering of the chocolate composition of this invention is conducted in the usual manner as is carried out in the molding of conventional milk chocolate. Temperatures range from about 27° C. to about 32° C., preferably 28° to 29° C.

Molding of the chocolate composition of this invention is also conducted under conditions used to form conventional chocolate. Unexpectedly, there is no difficulty in removing the molded product from the mold.

The following examples illustrate the invention in greater detail:

EXAMPLE 1

In a blender, 170 grams of melted cocoa butter at 45° C. was mixed with 3.14 grams of lecithin. To this mix was added slowly 160 grams of cocoa liquor and mixed until all of the cocoa was coated with cocoa butter. In another mixer, 120 grams of skim milk powder, 250 grams sugar and 90 grams water were mixed to produce a sweetened aqueous milk product. This milk product was slowly mixed at the minimum mixing speed with the cocoa butter coated cocoa in a manner to avoid significant increases in viscosity and also avoiding lumps and separation of the ingredients, for a period of time until all ingredients are enveloped/emulsified into the cocoa butter fat phase. The temperature of the mixture was maintained at 45° C. The resulting product was tempered at 28° C. using a standard chocolate tempering techniques. The product was molded and cooled to 5° C. for a minimum of 35 minutes and unmolded without difficulty. The resulting chocolate product, having a highly desirable molded appearance, is a solid one phase tablet demonstrating outstanding properties of hardness, gloss and snap. The water content of the chocolate product was 11.35 weight percent and the fat content was 32.52 weight percent. These percentages are based on the total chocolate composition.

EXAMPLE 2

In a similar manner as Example 1, 165.3 grams cocoa butter at 45° C. was mixed with 3.14 grams of lecithin. To this mix was added slowly, 190.13 grams of cocoa liquor. The aqueous milk product made in the same manner as Example 1, contained 106.38 grams skim milk powder, 208.8 grams sugar and 126.25 grams water. The careful mixing at 45° C. of the ingredients occurred as described in Example 1. The resulting product was tempered at 28° C. The product was molded and cooled to 5° C. for a minimum of 35 minutes and unmolded without difficulty. The resulting chocolate product, having a highly desirable molded appearance, is a solid one phase tablet demonstrating outstanding properties of hardness, gloss and snap. The water content of the chocolate product was 15.78 weight percent and the fat content was 33.5 weight percent of the total chocolate composition.

EXAMPLE 3

In a similar manner as Example 1 at 45° C., 110 grams dutched cocoa powder (10/11% alkalinized) was slowly mixed with 230 grams of cocoa butter containing 2 grams lecithin until the cocoa powder was coated. To the coated cocoa is slowly added 378 grams of sweetened condensed skimmed milk having the composition:

| | |
|---|---|
| Sugar | 46% |
| Water | 28% |
| Protein | 10% |
| Lactose | 13% |
| Fat | 1% |

The sweetened condensed skimmed milk was slowly mixed at the minimum mixing speed with cocoa butter coated cocoa in a manner to avoid significant increases in viscosity and also avoiding lumps and separation of the ingredients. The mixing occurs over a period of time until all ingredients are enveloped/emulsified into the cocoa butter phase.

The resulting product was tempered at 28° C. The product was molded and cooled at 5° C. for a minimum of 35 minutes and unmolded without difficulty. The resulting chocolate product, having a highly desirable molded appearance, is a solid one phase tablet demonstrating outstanding properties of hardness, gloss and snap. The water content of the chocolate product was 14.24 weight percent and the fat content 33.48 weight percent of the total chocolate composition.

In a similar manner as described in Examples 1 and 2, sugar alcohols such as sorbitol, mannitol, isomalt, maltitol, xylitol, erythritol and glactitol can be substituted for sugar.

What is claimed is:

1. A process for producing a water-containing milk chocolate composition containing from about 1 to about 16 weight percent water which comprises:
   (1) mixing cocoa butter with cocoa ingredients in the presence of an edible emulsifier to coat completely said cocoa ingredients;
   (2) blending water, sweetener and milk solids to form an aqueous product;
   (3) blending said cocoa butter-coated cocoa ingredients of step (1) with said aqueous product of step (2) with a minimum of mixing to form a uniform mixture without producing high viscosities, and thereafter, without a conching step;
   (4) tempering said resulting mixture of step (3) to temperatures in the range from about 27° C. to about 32° C.

2. The process of claim 1 wherein said milk chocolate composition is molded.

3. The process of claim 1 wherein said cocoa ingredients are selected from the group consisting of cocoa powder, cocoa liquor, dutched cocoa powder and mixtures thereof; the milk solids selected from the group consisting of fat-containing and no-fat containing milk solids; and the sweeteners and sugars selected from the group consisting of sugar, sucrose, fructose, glucose, maltose and mixtures thereof.

4. The process of claim 3 wherein said cocoa ingredients are present in amounts ranging from about 10 to about 30 weight percent; said milk solids from about 10 to about 20 weight percent; said sugar from about 20 to about 50 weight percent and the cocoa butter from about 20 to about 40 weight percent, said amounts based on the total milk chocolate composition.

5. The process of claim 3 wherein said cocoa ingredients are present in amounts ranging from about 15 to about 20 weight percent; said milk solids from about 12 to about 18 weight percent; said sugar from about 20 to about 30 weight percent and said cocoa butter from about 25 to about 35 weight percent, said amounts based on the total milk chocolate composition.

6. The process of claim 1 wherein said cocoa ingredients are selected from the group consisting of cocoa powder, cocoa liquor, dutched cocoa powder and mixtures thereof, the milk solids selected from the group consisting of fat-containing and no fat-containing milk solids and the sweeteners are sugar alcohols selected from the group consisting of sorbitol, mannitol, isomalt, maltitol, xylitol, erythritol, glactitol and mixtures thereof.

7. The process of claim 6 wherein said cocoa ingredients are present in amounts ranging from about 10 to about 30 weight percent, said milk solids from about 10 to about 20 weight percent; said sugar alcohols ranging from about 5 to about 55 weight percent and the cocoa butter from about 25 to 40 weight percent, said amounts based on the total milk chocolate composition.

8. The process of claim 6 wherein said cocoa ingredients are present amounts ranging from about 15 to 20 weight percent, said milk solids from about 12 to about 18 weight percent, said sugar alcohols in amounts from about 10 to about 40 weight percent and said cocoa butter present in amounts ranging from about 27 to about 35 weight percent, said amounts based on the total milk chocolate composition.

9. The process of claim 1 wherein the cocoa ingredients are selected from the group consisting of cocoa powder, cocoa liquor, dutched cocoa powder and mixtures thereof; the aqueous solution of water, sweetener and milk solids is selected from the group consisting of sweetened condensed skimmed milk, sweetened condensed partly skimmed milk and sweetened condensed milk and the sweeteners are selected from the group consisting of sugar, sucrose, fructose, glucose, maltose and mixtures thereof and sorbitol, mannitol, isomalt, maltitol, xylitol, erythritol, glactitol and mixtures thereof.

\* \* \* \* \*